United States Patent [19]

Barrus et al.

[11] Patent Number: 5,642,258

[45] Date of Patent: Jun. 24, 1997

[54] COMPUTER ACCESSORY INCLUDING A PIVOTABLY MOUNTED COMBINED HANDLE AND POWER SOURCE AND ASSOCIATED METHODS OF MANUFACTURING

[75] Inventors: Jeffrey C. Barrus; Dean P. Perkins, both of Tomball; Michael V. Leman; Paul M. Moore, both of Spring, all of Tex.

[73] Assignee: Compaq Computer Corporation, Houston, Tex.

[21] Appl. No.: 517,382

[22] Filed: Aug. 21, 1995

[51] Int. Cl.⁶ .............................. G06F 1/16; H05K 5/02; H01M 2/10
[52] U.S. Cl. ................................. 361/683; 429/98
[58] Field of Search ................. 364/708.1; 429/96–100; 16/110.5; 361/680–687

[56] References Cited

U.S. PATENT DOCUMENTS 5,107,401  4/1992  Youn .
5,293,300  3/1994  Leung ..................................... 361/683

FOREIGN PATENT DOCUMENTS 666523   8/1995  European Pat. Off. .......... G06F 1/16
4426262  2/1995  Germany .

OTHER PUBLICATIONS

IBM Technical Disclosure Bulletin, vol. 27, No. 11, Apr. 1985, New York, U.S., pp. 6692–6693, XP002017931 Anonymous, "Handle Used As Battery Compartment".

Primary Examiner—Michael W. Phillips
Attorney, Agent, or Firm—Konneker & Smith, P.C.

[57] ABSTRACT

A computer accessory and associated method of manufacturing provides multiple functions for use with a portable computer. In a preferred embodiment, a computer accessory has a keyboard tilt mechanism, an external battery, and a carrying handle in a single unit detachable from the computer. The external battery is contained within the carrying handle, which is pivotably mounted with respect to the computer. Rotation of the handle is limited by external shoulders formed thereon.

14 Claims, 3 Drawing Sheets

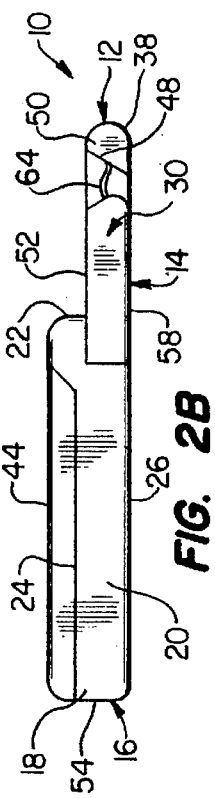
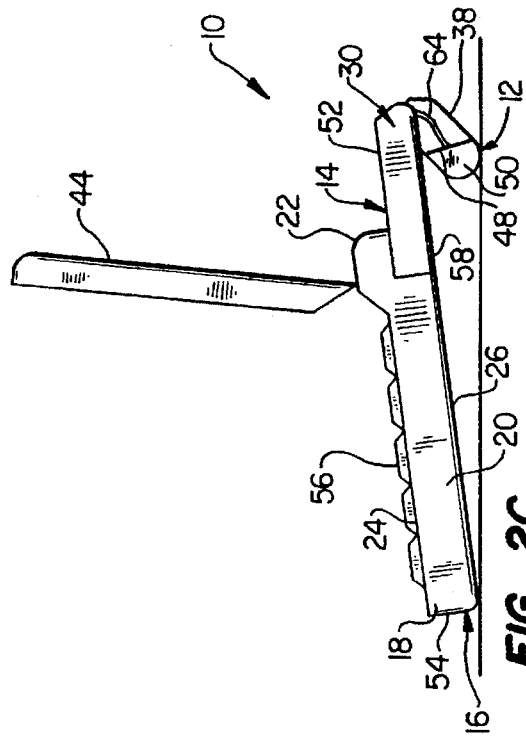
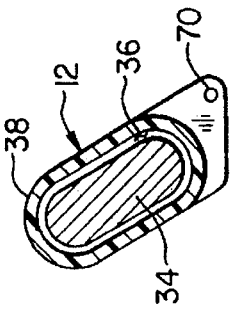
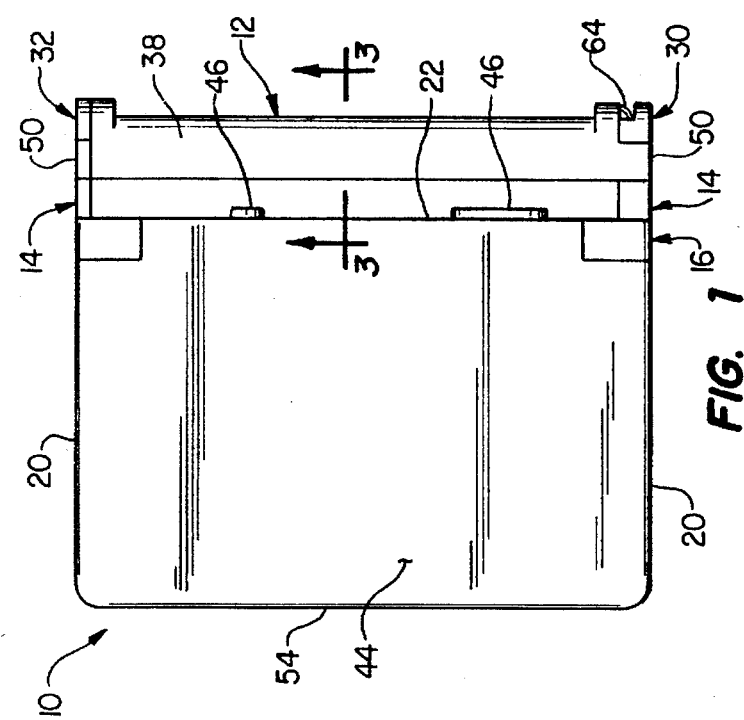
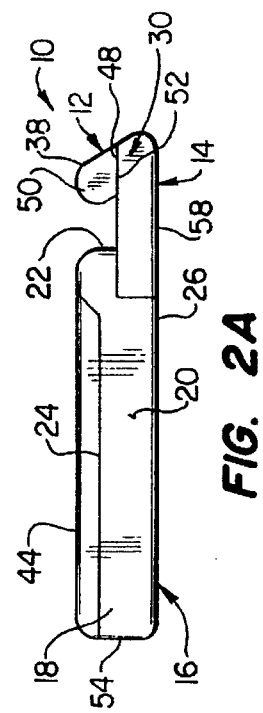

COMPUTER ACCESSORY INCLUDING A PIVOTABLY MOUNTED COMBINED HANDLE AND POWER SOURCE AND ASSOCIATED METHODS OF MANUFACTURING

BACKGROUND OF THE INVENTION

1. Field of the Invention

The present invention relates generally to computer accessories and, in a preferred embodiment thereof, more particularly provides an accessory having multiple functions for use with a portable computer.

2. Description of Related Art

Portable computers are well known in the art. They allow individuals to carry their computer, data, modem, fax, printer, etc. with them wherever they travel. Modern portable computers have become virtual portable offices.

Various terms have been coined for referring to the progressively miniaturized configurations of personal computers. The first portables were heavy, suitcase-sized, had limited functionality, and had to be plugged into a wall socket for power. Soon thereafter, smaller, lighter versions of portable computers were introduced which could be unfolded and placed on a person's lap for use, hence the name "laptop" computers. The next generation of portables, known as "notebook" computers, fit in a briefcase, have most of the functions available on a modern desktop computer, and have the ability to run for a limited time (usually less than a couple of hours) on power supplied by a rechargeable battery.

The latest advance in portable computer miniaturization is known as the "subnotebook" computer. It typically weighs less than five pounds, has a thin backlit display, and a keyboard which is only slightly smaller than that normally used with a desktop computer. Several typical subnotebook computers will fit in a briefcase. Reduced power consumption and advanced battery designs allow many hours of use before recharging is necessary.

Unfortunately, to achieve maximum miniaturization utilizing known technology, computer designers have had to eliminate some features from subnotebook computers. For example, subnotebook computers do not typically have a handle for carrying the computer. The user must either grasp the computer housing in his or her hand, or place the computer in a separate enclosure, such as a briefcase, which has its own handle. Thus, it is only convenient to transport a subnotebook computer if the user has sufficient room for it in a briefcase, and does not mind carrying the added briefcase bulk at the same time. For most users, however, this lack of convenient transport may defeat the very purpose which would make a subnotebook computer purchase desirable.

Additionally, subnotebook computers typically do not have a keyboard tilt mechanism to incline the keyboard. The keyboard is positioned on a horizontal plane on the lower portion of the computer housing when it is opened for use. This is uncomfortable for those users who must input large amounts of data via the keyboard. In the interest of reducing the computer's size, most computer manufacturers thereby sacrifice user comfort.

Furthermore, in selecting a subnotebook computer battery, computer designers are forced to compromise. Substantially increasing the size of the internal battery (and thereby increasing the size and weight of the computer) to achieve maximum battery operating time produces an unmarketably large computer that can no longer properly be termed a subnotebook computer. However, substantially decreasing the size of the internal battery, while allowing a desirably small computer configuration, produces short battery operating time.

One proposed solution to the battery size dilemma has been to provide a relatively small internal battery, useable for a correspondingly short amount of time, and another battery which is interchangeable with the computer's floppy disk drive. Thus, two computer configurations are possible using this proposed solution: One includes the internal battery and interchangeable floppy disk drive for situations in which a relatively short battery operating time is acceptable and a floppy disk drive is needed. The other includes the internal battery and interchangeable battery where an extended battery operating time is necessary and the functionality of the floppy disk drive is not needed.

The principal disadvantage of this proposed solution is that the functionality of the floppy disk drive must be traded for extended battery operating time. This is a trade that users may be reluctant to make.

Another disadvantage of this proposed solution is that the interchangeable floppy disk drive is separated from the computer itself when extended battery operating time is required. A relatively expensive computer accessory, it is exposed to an increased chance of contamination by dirt and dust, and damage from the forces produced by shock.

From the foregoing, it can be seen that it would be quite desirable to provide a portable computer having an accessory which does not require users to trade convenience of transport, comfort, or functionality for miniaturization. Such an accessory, which adds a carrying handle, a keyboard tilt mechanism, and extended battery operating time, would greatly increase a portable computer user's convenient use of the computer. It is accordingly an object of the present invention to provide such a computer accessory and associated methods of manufacturing.

SUMMARY OF THE INVENTION

In carrying out the principles of the present invention, in accordance with an embodiment thereof, a computer accessory is provided which is a multifunction accessory, utilization of which does not detract from the desirable features of a portable computer, but which enhances its functionality by making it more convenient and comfortable to use.

In broad terms, an apparatus is provided for transporting and supplying power by a user to a portable computer having a power-consuming device in a housing and a keyboard secured to the housing. The apparatus includes battery means, means for grasping the battery means in a hand of the user, means for releasably conductively connecting the battery means to the power-consuming device, and means for releasably mounting the grasping means to the computer housing so that when the grasping means is mounted to the housing, the user can lift the computer by grasping and lifting the grasping means, thereby suspending the computer from the grasping means.

In another aspect of the present invention, a portable computer of the type having power-consuming devices installed therein and being appropriately configured to be capable of operating on power supplied by an external self-contained power source is provided. The computer includes a housing, an accessory having handle means for lifting the housing, means for attaching the handle means to the housing, and power means disposed on the handle means for supplying power to the computer, and receiving means disposed on the housing for receiving the accessory attaching means and the power means.

A method of manufacturing an accessory for use with a computer of the type having a housing, the housing having top and bottom sides, first and second opposite end portions, and a rear side, a keyboard horizontally disposed on the top side of the housing, and an access port disposed on the rear side of the housing is also provided. The method includes the steps of providing an accessory bracket having first and second ends, forming a recess in the housing bottom side extending laterally from the first to the second opposite end portion for detachably receiving the accessory bracket, providing a handle grip having first and second ends, providing first and second linkages, articulably connecting the accessory bracket first end to the handle grip first end using the first linkage, articulably connecting the accessory bracket second end to the handle grip second end using the second linkage, and configuring the first and second linkages to selectively place the handle grip in a position adjacent the housing rear side, a position laterally rearwardly offset from the housing rear side, or a position adjacent the housing bottom side.

The use of the disclosed preferred embodiment computer accessory increases a user's comfort by providing a keyboard tilt mechanism, enhances transport convenience by providing a carrying handle, extends battery operating time by providing an external battery, and contributes to overall convenience of use by providing these functions in a single, integrated unit.

BRIEF DESCRIPTION OF THE DRAWINGS

FIG. 1 is a top plan view of a portable computer embodying principles of the present invention;

FIG. 2A is a side elevational view thereof, illustrating an accessory in a folded position;

FIG. 2B is a side elevational view thereof, illustrating the accessory in a handle position;

FIG. 2C is a side elevational view thereof, illustrating the accessory in a tilting position;

FIG. 3 is a cross-sectional view through the accessory, taken along line 3—3 of FIG. 1;

DETAILED DESCRIPTION

Figure 4:
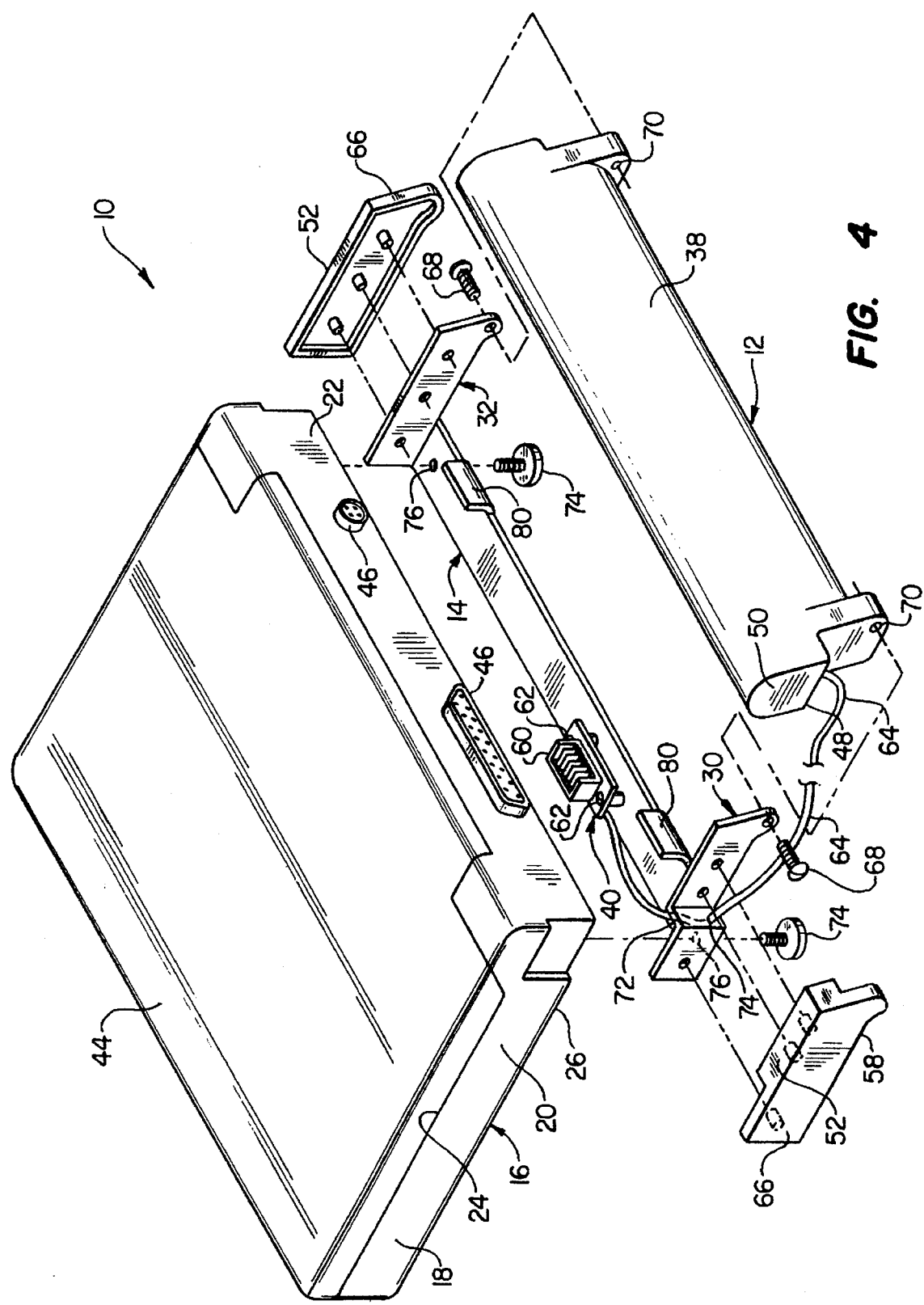
FIG. 4 is an isometric exploded view thereof.

Illustrated in FIG. 1 is a portable computer 10 which embodies principles of the present invention. An accessory 12 is mounted to the computer housing 16 by means of an accessory bracket 14. Inside the computer housing 16 are power-consuming devices (not shown) such as microprocessors, disk drives, etc.

As representatively shown in FIG. 1, the computer housing 16 has opposite ends 20 and a rear side 22. In normal use, the computer 10 is positioned on a desktop or a user's lap with the rear side 22 facing away from the user. Folded onto the housing 16 is a display screen 44.

Disposed on the rear side 22 of the housing 16 are connectors 46. The accessory 12 is illustrated in FIG. 1 in a folded position in which it provides some protection for the connectors 46 from damage.

The accessory 12 is movable by means of linkages 30, 32 which join a handle portion 38 of the accessory 12 to the accessory bracket 14. The accessory bracket 14, in turn, joins the accessory 12 to the computer housing 16.

Turning now to FIG. 2A, a side view of the portable computer 10 is representatively illustrated. The housing 16 has a keyboard portion 18 which has keys (not shown) on the housing's top surface 24. The display screen 44, when folded against the housing 16, covers the keys of the keyboard 18.

Attached to the housing ends 20 is the accessory bracket 14 which attaches the accessory 12 to the computer housing 16, as described above. In this view, linkage 30 is folded so that the accessory 12 is relatively close to the rear side 22 of the housing 16 for compact storage and protection of the connectors 46 on the rear side 22 of the housing 16.

In this folded orientation, a shoulder 48 on each accessory handle end 50 prevents the handle 38 from rotating leftwardly past its folded position further toward the computer housing 16. The shoulders 48 rest on a top surface 52 of the accessory bracket 14.

With the handle 38 in this position, the housing 16 may be rested on its bottom side 26 on a desktop or user's lap. The computer 10, with the handle 38 in this position, is also in its most compact configuration with the accessory 12 attached to the housing 16. To achieve an even more compact configuration, the accessory bracket 14 may be removed from the housing.

Turning to FIG. 2B, the computer 10 is representatively illustrated in a configuration in which the connectors 46 (not visible in FIG. 2B) on the housing rear side 22 can be accessed and the handle 38 can be used to lift the computer 10. The handle 38 has been pivoted on the linkages 30, 32 so that the shoulders 48 are no longer resting on the bracket top surfaces 52.

In this unfolded position, the handle 38 is extended laterally from the housing rear side 22 so that the user can grasp the handle 38 in his or her hand and conveniently transport the computer 10. Accessory bracket 14 and linkages 30, 32 have sufficient strength and are appropriately attached, as described hereinbelow, to support the weight of the computer 10.

Although the computer 10 is representatively illustrated in FIG. 2B in a horizontal orientation, it will be in a vertical orientation when suspended from the handle 38. Note, however, that the computer 10 may be used in its horizontal orientation as illustrated in FIG. 2B.

Turning now to FIG. 2C, the computer 10 is representatively illustrated in an inclined orientation, being tilted upwardly toward the rear side 22 of the housing 16. In this position, with the display screen 44 unfolded to expose the keys 56 on the top surface 24 of the housing 16, the user may conveniently type on the inclined keyboard 18. Note, also, that the connectors 46 on the housing rear side 22 are accessible with the computer 10 in this configuration.

This position of the computer 10 is accomplished by further clockwise rotation of the handle 38 on the linkages 30, 32 so that the handle 38 is proximate the housing bottom side 26 at the rear side 22 of the housing 16. The shoulders 48 on the handle ends 50 now rest against bottom surfaces 58 of the accessory bracket 14.

Turning now to FIG. 3, a cross section of the handle 38 is representatively illustrated. In this view, the hollow interior of the handle 38 may be seen. An internal chamber 36 extends substantially from end to end 50 in the handle 38.

Disposed within the internal chamber 36 is a battery 34 for supplying power to the computer 10. The battery 34 is shaped to be cooperatively received within the internal chamber 36. The manner in which the battery 34 is electrically connected to the computer 10 is described hereinbelow.

Illustrated in FIG. 4 is an exploded view of the computer 10. Electrical communication between the battery 34 (see FIG. 3) and power-consuming devices within the computer housing 16 is accomplished via connecting means 40. The connecting means 40 includes an electrical connector plug 60 mounted with fasteners 62 to the accessory bracket 14, and a cable 64 conductively attaching the plug 60 to the battery 34 within the handle 38. The cable 64 enters the internal chamber 36 via a hole (not shown) in the shoulder 48 on one end 50 of the handle 38. Linkage 30 has an offset 72 and a hole 74 for permitting the cable 64 to extent from the plug 60 to the handle 38.

The linkages 30, 32 are at either end of the accessory bracket 14 and form a part of the bracket 14. In the illustrated preferred embodiment, the linkages 30, 32 are formed at the ends of the bracket 14 and are covered with cover plates 66 for aesthetic purposes. The cover plate 66 which is installed over the linkage 30 also serves to protect and constrain the cable 64 between the cover plate 66 and the linkage 30, and to allow movement of the cable 64 when the handle 38 is rotated to a desired position. The handle 38 is pivotably attached to the linkages 30, 32 with fasteners 68 which are installed into holes 70 in the handle 38.

In this manner, the handle 38 and linkages 30, 32 operate in a fashion similar to an arm, with a joint intermediate the ends of the arm. It is to be understood, however, that other linkages, having multiple links, different shapes, etc., could be provided for attaching the handle 38 to the accessory bracket 14 without deviating from the principles of the present invention.

Figure 5:
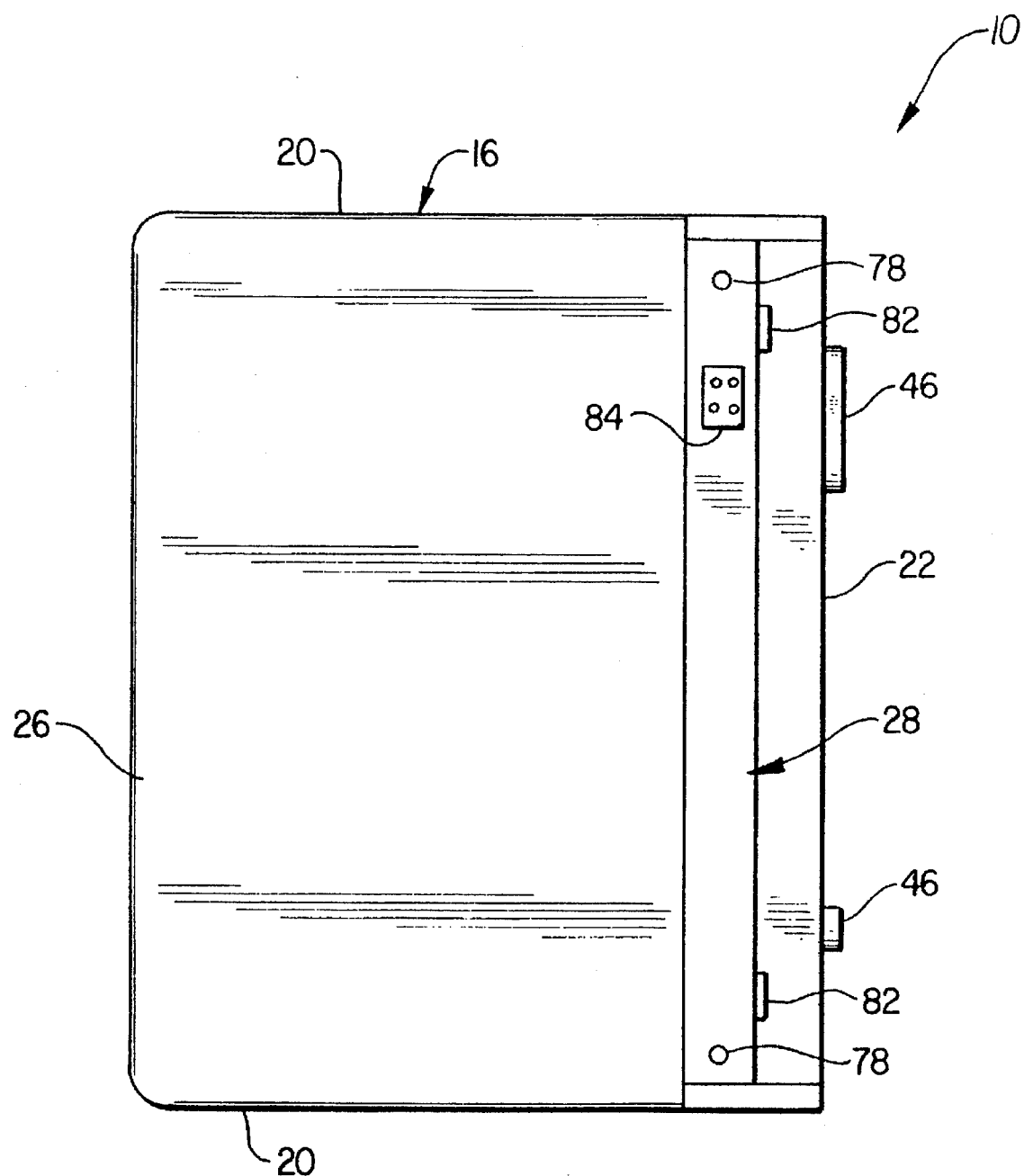
FIG. 5 is a bottom plan view thereof.

The accessory bracket 14 is attached to the housing 16 on its bottom side 26 with fasteners 74 which extend through holes 76 in the accessory bracket into holes 78 in the housing bottom side 26 (see FIG. 5). Upwardly extending tabs 80 on the accessory bracket 14 serve to align the accessory bracket 14 on the housing bottom side 26 and also provide a flat bearing surface for suspending the computer 10 from the handle 38. In this manner, the tabs 80 act to prevent stresses due to the weight of the suspended computer 10 from being transferred to the connector plug 60.

Thus, it can be clearly seen that the accessory 12 may be conveniently removed from the housing 16 by simply removing fasteners 74 from the holes 76 in the housing bottom side 26 (see FIG. 5). The user may then simultaneously remove the tabs 80 and plug 60 from the housing bottom side, thereby both structurally and electrically disconnecting the accessory 12. Reattachment of the accessory 12 to the housing 16 requires only that the user reverse the procedure described immediately above. This permits the user to easily and simultaneously attach or detach a battery, handle, connector protector, and tilt mechanism to his or her portable computer 10.

FIG. 5 shows the housing bottom side 26 with the accessory 12 detached. A recess 28 cooperatively shaped to receive the accessory bracket 14 therein extends substantially between the housing opposite ends 20. The recess 28 allows the computer 10 to lie flat on a horizontal surface when the accessory bracket 14 is installed onto the housing bottom side 26. Holes 78 receive fasteners 74 for securing the bracket 14 to the housing bottom side. Slots 82 receive the tabs 80 when the bracket 14 is inserted into the recess 28. Connector socket 84 is electrically connected to the power-consuming devices within the computer housing 16. When the bracket 14 is inserted into the recess 28, plug 60 (see FIG. 4) electrically connects to socket 84, thereby permitting electrical communication between the battery 34 and the power-consuming devices in the housing 16. Socket 84 is shown in FIG. 5 as an optional pin-type connector, whereas a spade-type connector would preferably be utilized for operative engagement with plug 60, shown in FIG. 4 as a spade-type connector.

The foregoing detailed description is to be clearly understood as being given by way of illustration and example only, the spirit and scope of the present invention being limited solely by the appended claims.

What is claimed is:

1. Apparatus for transporting and supplying power to a computer of the type that may be lifted by a user, the computer having a power-consuming device disposed within a housing and a keyboard secured to said housing, said apparatus comprising:

a battery for supplying power to the power-consuming device;

means for grasping said battery in a hand of the user;

means for conductively connecting said battery to the power-consuming computer device so that when said battery is conductively connected to the power-consuming device, the device is operative from power supplied by said battery;

means for mounting said grasping means to the computer housing so that when said grasping means is mounted to the housing, the user is permitted to lift the computer by grasping and lifting said grasping means thereby suspending the computer from said grasping means; and means for limiting rotational displacement of said grasping means relative to said mounting means, said limiting means permitting a preselected range of rotation of said grasping means relative to said mounting means, whereby, by mounting said grasping means to the computer housing and connecting said battery to the power-consuming computer device, the user may conveniently lift, transport, and operate the computer.

2. The apparatus according to claim 1, wherein said grasping means comprises a container having an exterior surface graspable by the user's hand, said container being cooperatively shaped to contain said battery means therein.

3. The apparatus according to claim 1, wherein said connecting means comprises:

a pair of mating electrical connectors, one of said electrical connectors being securable to the housing and being capable of electrical communication with the power-consuming device, the other of said electrical connectors being secured to said mounting means; and a conductor conductively joining said battery to said other of said electrical connectors.

4. The apparatus according to claim 3, wherein said mounting means and said connecting means are cooperatively configured so that said one of said electrical connectors mates with said other of said electrical connectors, thereby permitting electrical communication between said battery and the power-consuming device, when said grasping means is mounted to the housing.

5. The apparatus according to claim 1, wherein said mounting means comprises:

an arm having opposite ends, said grasping means being secured to one of said arm opposite ends, and the other one of said arm opposite ends being releasably mountable to the housing; and a joint intermediate said grasping means and said other one of said arm opposite ends such that said arm is foldable with respect to said grasping means.

6. The apparatus according to claim 5, wherein said arm and said joint are configured such that said grasping means may be folded into a selected one of a first unfolded position in which said grasping means is graspable by the user's hand, a second folded position in which said grasping means is disposable adjacent the housing, and a third folded position in which the housing is restable on said grasping means to incline the keyboard.

7. An accessory for use with a computer of the type having a housing, the housing having top and bottom sides, first and second opposite end portions, and a rear side, a keyboard horizontally disposed on the top side of the housing, a recess formed in the housing bottom side, the recess extending laterally from the first to the second opposite end portion, and an access port disposed on the rear side of the housing, said accessory comprising:

an accessory bracket having first and second ends, said accessory bracket being detachably receivable in the recess;

a handle grip having first and second ends, each of said handle grip first and second ends having a surface formed thereon; and first and second linkages, said first linkage being capable of articulably connecting said accessory bracket first end to said handle grip first end and said second linkage being capable of articulably connecting said accessory bracket second end to said handle grip second end, said first and second linkages cooperating with said handle grip first and second end surfaces to limit relative movement therebetween and to enable selective disposition of said handle grip in a selected one of a first position adjacent the housing rear side, a second position laterally rearwardly offset from the housing rear side, and a third position adjacent the housing bottom side, whereby, by articulating said first and second linkages, the user may conveniently dispose said handle grip from a selected one of said first, second, and third positions to another one of said first, second, and third positions.

8. The accessory according to claim 7, wherein said accessory bracket and said recess are cooperatively shaped so that the computer is suspendable from said handle grip when said accessory bracket is received in said recess.

9. The accessory according to claim 7, wherein said handle grip further comprises:

an internal chamber formed intermediate said first and said second handle grip ends; and a battery in said chamber.

10. The accessory according to claim 9, wherein the computer further includes a first electrical connector disposed on the computer housing adjacent the recess, and the accessory further comprising:

a second electrical connector disposed on said accessory bracket so that when said accessory bracket is received in said recess, said first and second electrical connectors are connectable; and means for conducting electricity between said battery and said second electrical connector.

11. A method of manufacturing an accessory for use with a computer of the type having a housing, the housing having top and bottom sides, first and second opposite end portions, and a rear side, a keyboard horizontally disposed on the top side of the housing, a recess in the housing bottom side, the recess extending laterally from the first to the second opposite end portion, and an access port disposed on the rear side of the housing, said method comprising the steps of:

providing an accessory bracket having first and second ends, said accessory bracket being detachably receivable in the recess;

providing a handle grip having first and second ends, each of said handle grip first and second ends having a surface formed thereon;

providing first and second linkages;

articulably connecting said accessory bracket first end to said handle grip first end using said first linkage;

articulably connecting said accessory bracket second end to said handle grip second end using said second linkage; and configuring said first and second linkages to enable cooperative engagement with said handle grip first and second end surfaces and selective disposition of said handle grip in a selected one of a first position adjacent the housing rear side, a second position laterally rearwardly offset from the housing rear side, and a third position adjacent the housing bottom side, said handle grip first and second end surfaces limiting relative movement between said accessory bracket and said handle grip, whereby, an accessory is produced which permits the user, by articulating said first and second linkages, to conveniently dispose said handle grip from a selected one of said first, second, and third positions to another one of said first, second, and third positions.

12. The method according to claim 11, wherein the recess is cooperatively shaped for receiving said accessory bracket, and further comprising the step of suspending the computer from said handle grip by receiving said accessory bracket in the recess.

13. The method according to claim 11, wherein said handle grip providing step further comprises:

forming an internal chamber in said handle grip intermediate said first and said second handle grip ends; and disposing a battery in said chamber.

14. The method according to claim 13, wherein the computer includes a first electrical connector disposed adjacent the recess, and further comprising the steps of:

disposing a second electrical connector on said accessory bracket so that when said accessory bracket is received in the recess, said first and second electrical connectors are connectable; and conductively connecting said battery to said second electrical connector.

* * * * *